United States Patent Office 3,636,168
Patented Jan. 18, 1972

3,636,168
PREPARATION OF POLYNUCLEAR AROMATIC COMPOUNDS
Roy R. Josephson, West Marlborough Township, Chester County, Pa., assignor to Hercules Incorporated, Wilmington, Del.
No Drawing. Filed Dec. 29, 1969, Ser. No. 888,937
Int. Cl. C07c 79/10, 79/12
U.S. Cl. 260—645        9 Claims

ABSTRACT OF THE DISCLOSURE

A process is provided for the coupling of aromatic compounds to produce polynuclear aromatic compounds wherein the reaction is carried out in liquid hydrogen fluoride by contacting the aromatic compound with a mixture of a mercuric salt and a catalytic amount of a noble metal salt, the noble metal being palladium, rhodium, ruthenium or gold.

This invention relates to a process of coupling aromatic compounds and more particularly to a process of coupling substituted aromatic compounds at a high rate and to obtain a high yield of the desired biaryl isomer.

It is well known that aryl compounds can be coupled by means of palladium salts but the rates are low and in the case of electronegatively substituted aryls such as methyl benzoate, the rate is so slow that it is impractical and the products are mixtures of the several isomeric diaryls and it is not possible to produce any one isomer as the major product.

Now in accordance with this invention it has been found that aryl compounds can be coupled at a high rate of reaction by using as the coupling agent a mercuric salt in combination with a catalytic amount of a palladium, ruthenium, rhodium or gold salt and carrying out the reaction in liquid hydrogen fluoride.

While the process of this invention can be applied to the coupling of a wide variety of aromatic compounds which have a labile hydrogen atom, it is of particular importance when applied to an electronegatively substituted aryl compound, the coupling reaction taking place at a high rate of reaction and at the same time, making it possible to select conditions such that one isomer or another of the disubstituted-biaryl is produced as the major product.

Any aromatic compound having the formula

R—Ar—X where Ar is any aromatic nucleus such as that of benzene, naphthalene, biphenyl, anthracene, etc., X is H or an alkyl of 1 to 3 carbon atoms, halogen, nitro, carboxy, or carboalkoxy, where the alkoxy group contains 1 to 3 carbon atoms, and R is H or an alkyl of 1 to 3 carbon atoms or can be halogen when X is halogen. Exemplary of these aromatic compounds which can be coupled by the process of this invention are aromatic hydrocarbons such as benzene, naphthalene, biphenyl, anthracene, etc., and their mono- and di-alkyl-substituted derivatives such as toluene, o-, m-, and p-xylene, ethylbenzene, cumene, cymene, etc., nitro-substituted aryls such as nitrobenzene, o-nitrotoluene, p-nitrotoluene, etc., carboxy-substituted aryls such as benzoic acid, o-, m-, and p-toluic acid, naphthoic acid, etc., halo-substituted aryls such as chloro-, bromo-, fluoro-, and iodobenzene, 1,2-dichlorobenzene, 1,4-dichlorobenzene, o-, m-, and p-chlorotoluene, etc., and carboalkoxy-substituted aryls such as methyl, ethyl, propyl, and isopropyl benzoate, and the corresponding esters of the toluic acids, naphthoic acid, etc.

Any mercuric salt, that has substantial solubility in the liquid hydrogen fluoride reaction medium or that is converted to a fluoride or to a complex in the hydrogen fluoride, can be used as the coupling agent in the process of this invention. Exemplary of the mercuric salts, or compounds that are converted to such in situ, are mercuric oxide, mercuric fluoride, mercuric perchlorate, mercuric tetrafluoroborate, mercuric acetylacetonate, the mercuric salts of alkanoic acids having 2 to 10 carbon atoms such as mercuric acetate, propionate, butyrate, hexanoate, octanoate, or decanoate, etc. While a stoichiometric amount of the mercuric salt is required for the coupling reaction, i.e., 1 mole per mole of the aromatic compound being coupled, the amount of mercuric salt can be varied over a wide range, and generally will be within the range of one mole per mole of aromatic compound up to 1 mole per 10 moles of aromatic compound.

The noble metal salt that is used as a catalyst for the process of this invention can be any palladium, rhodium, ruthenium, or gold salt that has substantial solubility in the liquid hydrogen fluoride reaction medium or that is converted to a fluoride or to a complex in the hydrogen fluoride. Exemplary of the compounds that can be used are palladium metal, which forms the fluoride in situ, the noble metal salts of alkanoic acids having 2 to 10 carbon atoms such as palladium acetate, propionate, butyrate, octanoate, decanoate, and the corresponding salts of rhodium, gold and ruthenium, and the fluorides, chlorides, oxides, nitrates, acetylacetonates, sulfonates, and/or complexes thereof, of these metals. The amount of the noble metal salt that is used can vary from a catalytic amount, as for example, a molar ratio of noble metal salt to the mercury salt of 1 to 10,000 up to as high as 1 to 10 but generally will be in the range of 1 to 1000 to 1 to 100, and more preferably about 1 to 500. The exact amount to be used will depend upon the choice of the noble metal compound, the aryl compound being coupled, and, in the case of the substituted aryls, the disubsituted-biaryl isomer desired. Thus for the electronegatively substituted aryls which are more difficult to couple, a higher ratio of noble metal to mercury is preferred, whereas extremely low ratios of noble metal to mercury can be used for coupling aryl hydrocarbons.

The process of this invention can be carried out at any convenient temperature but generally will be carried out within the range of from about −20° to about 150° c. The preferred temperature will depend on the reactivity of the aromatic compound being coupled, the more reactive ones being run at the lower temperatures and the less reactive ones at the higher temperatures, and, in the case of substituted aryls, the temperature to be used will depend upon the isomer desired to be produced. For example, if a mono-substituted aryl such as nitrobenzene is being coupled, low temperatures and low concentrations of the noble metal compound will favor the production of the 3,3'-dinitrophenyl and higher temperatures and higher concentrations of the noble metal compound will favor the 2,3'-dinitrobiphenyl. Thus, the process of this invention makes it possible to select conditions favoring the production of a particular isomer as the major product.

The process can be carried out at any desired pressure, sufficient pressure being applied at the prevailing temperature to maintain the hydrogen fluoride in the liquid phase. Thus, the pressure will range from slightly above atmospheric at 20° C. to about 85 p.s.i.g. at a reaction temperature of 100° C.

The process is generally carried out under substantially anhydrous conditions. However, if an oxide such as mercuric oxide is used, there will, of course, be water formed during the reaction. In any event, anhydrous conditions are not essential and water in amounts up to about 20% or more of the hydrogen fluoride diluent can be tolerated without adversely affecting the reaction, although at the higher amounts the reaction rate is reduced.

The following examples will illustrate the process of this invention. All parts and percentages are by weight unless otherwise indicated.

EXAMPLE 1

A Teflon-lined reaction vessel equipped with a magnetic stirrer was charged with 0.010 mole of mercuric fluoride, 0.01 millimole of palladium acetate and 0.1 mole of o-xylene. To the stirred mixture was added 2.0 ml. of anhydrous, liquid hydrogen fluoride. The reaction mixture was stirred at room temperature for 1 hour after which the hydrogen fluoride was removed by evaporation under a stream of nitrogen. To the dry gray solid residue remaining was added 50 ml. of hexane. Analysis of the hexane solution by gas-liquid partition chromatography showed it to contain 1.8% w./v. of 3,4,3',4'-tetramethylbiphenyl and 0.2% of a different tetramethylbiphenyl isomer, probably 2,3,3',4'-tetramethylbiphenyl. The hexane solution was filtered under nitrogen pressure and the residue was washed 3 times with 50 ml. portions of hot hexane. The hexane solution and washings were combined and the solvent was removed. The mixture of tetramethylbiphenyls so obtained amounted to a 95% conversion based on the mercury charged.

EXAMPLE 2

The procedure of Example 1 was repeated with the following charge of reactants: 0.04 mole mercuric fluoride, 0.1 millimole of palladium acetate, 40 ml. of o-xylene and 10 ml. of hydrogen fluoride. The reaction was carried out at 60° C. for 1 hour. The tetramethylbiphenyl so obtained consisted of 85% of the 3,4,3',4'-isomer and 15% of the 2,3,3',4'-isomer.

EXAMPLE 3

The procedure of Example 1 was repeated with the following charge of reactants: 0.001 mole of mercuric oxide, 0.009 millimole of palladium acetate, 13 mg. of ferric nitrate, 0.06 mole of o-xylene, and 2 ml. of hydrogen fluoride. In this example the reaction was carried out under 80 p.s.i. of oxygen at 120° C. for 3 hours. The tetramethylbiphenyl so obtained amounted to a conversion of 84% based on mercury and contained 95% of the 3,4,3',4'-isomer and 5% of the 2,3,3',4'-isomer.

EXAMPLE 4

A Teflon-lined reactor equipped with a magnetic stirrer was charged with 0.016 mole of mercuric oxide, 0.0022 mole of palladium acetate, 0.034 mole of nitrobenzene and 20 ml. of liquid hydrogen fluoride. The reaction mixture wa stirred at 30° C. for 18 hours. The hydrogen fluoride was then evaporated in a stream of nitrogen and the residue was extracted with 50 ml. of hot acetone. Analysis of the acetone extract by gas-liquid chromatography showed it to contain 2.75 g. of dinitrobiphenyl, a conversion of 84% based on mercury. The dinitrobiphenyl consisted of 97% of the 2,3'-isomer and 3% of the 3,3'-isomer.

EXAMPLE 5

The procedure described in Example 4 was repeated with the following reactants charged: 0.013 mole of mercuric fluoride, 0.0004 mole of palladium acetate, 0.039 mole of nitrobenzene, and 50 ml. of hydrogen fluoride. The reaction was carried out at 30° C. for 12 hours. The dinitrobiphenyl so obtained amounted to a conversion of 69%, based on mercury, and consisted of 54% of 3,3'-isomer and 46% of the 2,3'-isomer.

EXAMPLE 6

The procedure described in Example 4 was repeated with the following charge: 0.015 mole of mercuric fluoride, 0.0028 mole of palladium fluoride, 0.7 g. of potassium tetrafluoroborate, 0.095 mole of nitrobenzene and 50 ml. of hydrogen fluoride. The reaction was carried out at 30° C. for 36 hours. There was obtained a 100% conversion to 2,3'-dinitrobiphenyl, based on mercury.

EXAMPLE 7

A Teflon-lined reactor equipped with a magnetic stirrer was charged with 0.01 mole of mercuric fluoride, 0.0007 mole of palladium acetate, 0.057 mole of methyl benzoate and 0.40 mole of hydrogen fluoride. The reaction mixture was stirred for 4 hours at 30° C. The hydrogen fluoride was evaporated under a stream of nitrogen, the last traces being removed by the addition of 1 g. of sodium fluoride. The residue was then extracted with 30 ml. of hot benzene. The benzene extract was analyzed by gas-liquid chromatography, which indicated that it contained 1.22 g. of dicarbomethoxybiphenyl, which consisted of 65% of the 2,3'-isomer and 35% of the 2,2'-isomer. This corresponds to an 88% conversion, based on mercury.

EXAMPLE 8

The procedure of Example 7 was repeated with the following charge: 0.05 mole of mercuric oxide, 0.0007 mole of palladium acetate, 14 g. of methyl benzoate, and 10 ml. of hydrogen fluoride. The reaction was carried out at 30° C. for 13.5 hours. There was obtained a 72% conversion, based on mercury, to the dicarbomethoxybiphenyl, which contained 89% of the 2,3'-isomer, 7% of the 2,2'-isomer and 4% of the 3,3'-isomer.

EXAMPLE 9

This example illustrates the effect of temperature on the coupling of nitrobenzene. In each of these runs, the reactor was charged with 0.023 mole of mercuric oxide, 0.22 millimole of palladium acetate, 4.8 g. of nitrobenzene and 10 ml. of liquid hydrogen fluoride. The reaction mixtures were stirred for 36 hours, one at 30° C., one at 60° C., and the third at 100° C. Tabulated below is the conversion to dinitrobiphenyl obtained, based on mercury, together with the percentage of each isomer in the product.

| Run | Reaction temp. (° C.) | Percent conversion | Isomer distribution, percent | | | |
|---|---|---|---|---|---|---|
| | | | 2,2' | 2,3' | 3,3' | 3,4' |
| (a) | 30 | 65 | 2 | 40 | 54 | 4 |
| (b) | 60 | 55 | 2 | 72 | 24 | 2 |
| (c) | 100 | 62 | | 80 | 10 | 10 |

EXAMPLE 10

The procedure of Example 4 was repeated with the following charge: 0.0125 mole of mercuric acetate, 0.44 millimole of palladium acetate, 4.8 g. of nitrobenzene and 50 ml. of liquid hydrogen fluoride. The reaction mixture was stirred at 30° C. for 12 hours. There was obtained a 66% conversion, based on mercury, to dinitrobiphenyl which was 45% of the 2,3'-isomer and 55% of the 3,3'-isomer.

EXAMPLE 11

The reactor was charged with 8.4 millimoles of mercuric fluoride, 0.23 millimole of auric oxide, 1.2 g. of nitrobenzene and 10 ml. of liquid hydrogen fluoride. The reaction mixture was stirred for 20 hours at 30° C. The dinitrobiphenyl so produced consisted of 28.5% of the 2,3'-isomer and 71.5% of the 3,3'-isomer.

EXAMPLE 12

The reactor was charged with 9.25 millimoles of mercuric oxide, 0.23 millimole of auric oxide, 1.2 g. of nitrobenzene and 10 ml. of liquid hydrogen fluoride. The reaction mixture was stirred for 24 hours at 100° C. The dinitrobiphenyl so produced consisted of 31.7% of the 2,3'-isomer and 68.3% of the 3,3'-isomer.

EXAMPLE 13

The reactor was charged with 10 millimoles of mercuric oxide, 1.0 millimole of aurochlorohydric acid (HAuCl$_4$·3H$_2$O) 1.2 g. of nitrobenzene and 10 ml. of hydrogen fluoride. The reaction mixture was stirred for 6 hours at 100° C. The dinitrobiphenyl so obtained consisted of 66% of the 2,3'-isomer and 34% of the 3,3'-isomer.

EXAMPLE 14

The reactor was charged with 4.6 millimoles of mercuric oxide, 0.30 millimole of rhodium chloride-trisacetonitrile, 2.4 g. of nitrobenzene and 10 ml. of liquid hydrogen fluoride. The reaction mixture was stirred for 6 hours at 100° C. There was obtained only 2,3'-dinitrobiphenyl and there was no trace of other isomers.

EXAMPLE 15

The reactor was charged with 8.4 millimoles of mercuric fluoride, 0.45 millimole of rhodium chloride-trisacetonitrile, 2.4 g. of nitrobenzene and 10 ml. of liquid hydrogen fluoride. The reaction mixture was stirred for 10 hours at 120° C. The dinitrobiphenyl so obtained consisted of 95% of the 2,3'-isomer and a small amount of the 2,4'-isomer.

EXAMPLE 16

Example 15 was repeated except that 2.3 g. of toluene was substituted for the nitrobenzene used in that example and the reaction was run 8 hours instead of 10. There was obtained a 533% conversion to dimethylbiphenyl, based on rhodium, or a 57% conversion, based on mercury. It consisted of 94.7% of the 2,3'-isomer and 5.3% of the 3,3'-isomer.

EXAMPLE 17

A polyethylene reactor equipped with a magnetic stir bar was charged with 0.010 mole of mercuric fluoride, 0.0001 mole of palladium acetate and 40 ml. of toluene. The mixture was cooled to 0° C. in an ice bath and 10 ml. of hydrogen fluoride was added. After stirring the mixture at 30° C. for 2 hours, the hydrogen fluoride was evaporated, 50 ml. of hexane was added and the mixture was stirred thoroughly. The hexane-toluene solution was analyzed by gas-liquid partition chromatography. It contained 0.71% w./v. of p,p'-bitolyl together with minor amounts of other bitolyl isomers.

EXAMPLE 18

A polyethylene reactor was charged with 0.010 mole of mercuric fluoride, 0.00010 mole of palladium acetate and 3.85 g. of naphthalene. After cooling to 0° C., 10 ml. of hydrogen fluoride was added and the mixture was stirred at 20° C. for 4 hours. The hydrogen fluoride was evaporated under a stream of nitrogen. Analysis of the residue by gas-liquid chromatography showed that the product was binaphthyl.

EXAMPLE 19

Example 18 was repeated except that biphenyl was used in place of naphthalene. The product so produced was quater-phenyl.

EXAMPLE 20

A Teflon-lined reactor was charged with 0.001 mole of ruthenium tetraoxide, 0.01 mole of mercuric acetate, 0.06 mole of o-xylene, and 2.5 ml. of hydrogen fluoride. The reaction mixture was stirred at 100° C. for 8 hours. The tetramethylbiphenyl so produced consisted of 85% of the 2,3,3',4'-isomer and 15% of the 3,4,3',4'-isomer.

EXAMPLE 21

A teflon-lined reactor was charged with 0.10 mole of mercuric oxide, 0.004 mole of palladium acetate, 0.30 mole of chlorobenzene and 25 ml. of hydrogen fluoride. The reaction mixture was stirred at 50° C. for 6 hours. There was obtained 5.3 g. of mixed isomers of dichlorobiphenyl having a boiling point range of 185–200° C. at 3 mm. This corresponds to a conversion of 46.2% based on mercury.

The process of this invention makes it possible to produce diaryl compounds having wide utility. For example, the dinitro-diaryls can be reduced to the corresponding diamino-diaryls useful in the preparation of polyamides and polyimides. The tetraalkyldiaryls can be oxidized to tetracarboxylic acids and their anhydrides, useful for the preparation of polyimides and the dicarboxylicdiaryls are useful for the preparation of polyesters, polyamides, and polyimidazoles. Many other uses for the polyfunctional diaryls produced will be obvious to those skilled in the art.

What I claim and desire to protect by Letters Patent is:

1. The process for producing a diaryl compound which comprises contacting an aromatic compound with a mixture of a mercuric salt and at least a catalytic amount of a nobel metal salt in liquid hydrogen fluoride, said noble metal being selected from palladium, rhodium, ruthenium and gold and said aromatic compound having the formula R—AR—X where Ar is an aromatic nucleus, X is H, halogen, nitro, carboxy or carboalkoxy and R is H, or alkyl or can be halogen when X is halogen, said alkyl and alkoxy groups containing 1 to 3 carbon atoms.

2. The process of claim 1 wherein the aromatic compound is nitrobenzene.

3. The process of claim 1 wherein the aromatic compound is o-xylene.

4. The process of claim 1 wherein the noble metal salt is a palladium salt.

5. The process of claim 4 wherein the palladium salt is a palladous salt of an alkanoic acid containing 2 to 10 carbon atoms.

6. The process of claim 1 wherein the aromatic compound is contacted with mercuric fluoride and palladium acetate in a molar ratio of mercury to palladium of from about 10,000:1 to about 10:1.

7. The process of claim 1 wherein the aromatic compound is contacted with mercuric acetate and palladium acetate in a molar ratio of mercury to palladium of from about 10,000:1 to about 10:1.

8. The process of claim 1 wherein the aromatic compound is contacted with mercuric fluoride and rhodium trichloride trisacetonitrile in a molar ratio of mercury to rhodium of from about 10,000:1 to about 10:1.

9. The process of claim 1 wherein the aromatic compound is contacted with mercuric oxide and palladium fluoride in a molar ratio of mercury to palladium of from about 10,000 to about 10:1.

References Cited

UNITED STATES PATENTS 2,525,811  10/1950  Lien et al. _____ 260—670 X
3,492,361  1/1970   Puskas et al. _____ 260—645

LELAND A. SEBASTIAN, Primary Examiner

U.S. Cl. X.R.

260—476 R, 646, 649 R, 649 D, 670